United States Patent
Belgaied et al.

(10) Patent No.: US 7,613,198 B2
(45) Date of Patent: Nov. 3, 2009

(54) METHOD AND APPARATUS FOR DYNAMIC ASSIGNMENT OF NETWORK INTERFACE CARD RESOURCES

(75) Inventors: Kais Belgaied, Sunnyvale, CA (US); Sunay Tripathi, San Jose, CA (US); Nicolas G. Droux, Rio Rancho, NM (US)

(73) Assignee: Sun Microsystems, Inc., Santa Clara, CA (US)

( * ) Notice: Subject to any disclaimer, the term of this patent is extended or adjusted under 35 U.S.C. 154(b) by 482 days.

(21) Appl. No.: 11/479,817

(22) Filed: Jun. 30, 2006

(65) Prior Publication Data
US 2008/0002714 A1 Jan. 3, 2008

(51) Int. Cl.
*H04L 12/28* (2006.01)
(52) U.S. Cl. ..................... 370/412; 370/419
(58) Field of Classification Search ............... 370/412, 370/413, 414, 415, 416, 417, 418, 419, 420, 370/421
See application file for complete search history.

(56) References Cited

U.S. PATENT DOCUMENTS

| | | | |
|---|---|---|---|
| 5,852,630 A * | 12/1998 | Langberg et al. ............ 375/219 |
| 6,041,053 A | 3/2000 | Douceur et al. |
| 6,070,219 A | 5/2000 | McAlpine et al. |
| 6,131,163 A | 10/2000 | Wiegel |
| 6,163,539 A | 12/2000 | Alexander et al. |
| 6,477,643 B1 | 11/2002 | Vorbach et al. |
| 6,600,721 B2 | 7/2003 | Edholm |
| 6,714,960 B1 | 3/2004 | Bitar et al. |
| 6,757,731 B1 | 6/2004 | Barnes et al. |
| 6,831,893 B1 | 12/2004 | Ben Nun et al. |
| 6,859,841 B2 | 2/2005 | Narad et al. |
| 6,944,168 B2 | 9/2005 | Paatela et al. |
| 7,046,665 B1 | 5/2006 | Walrand et al. |
| 7,146,431 B2 | 12/2006 | Hipp et al. |
| 7,177,311 B1 | 2/2007 | Hussain et al. |
| 7,260,102 B2 * | 8/2007 | Mehrvar et al. ............ 370/412 |
| 7,313,142 B2 | 12/2007 | Matsuo et al. |

(Continued)

OTHER PUBLICATIONS

Dovrolis, C., Thayer, B. and Ramanathan P.: "HIP: Hybrid Interrupt—Polling for the Network Interface", ACM SIGOPS Operating Systems Review, vol. 35, Iss. 4, Oct. 2001, 11 pages.

(Continued)

*Primary Examiner*—Jayanti K Patel
*Assistant Examiner*—Bo Hui A Zhu
(74) *Attorney, Agent, or Firm*—Osha • Liang LLP (57) ABSTRACT

A method for dynamically changing a virtual network interface card (VNIC) binding. If the use of a hardware receive ring (HRR) is below the first threshold and the use of the software receive ring (SRR) is above the second threshold, then: binding the first VNIC to the SRR and the second VNIC to the HRR, removing the binding from the first VNIC to the HRR, removing the binding from the second VNIC to the SRR, and reprogramming a hardware classifier to send packets associated with the r VNIC to a second HRR and to send packets associated with the second VNIC to the HRR, reprogramming a software classifier to send packets associated with the first VNIC to the SRR, wherein the software classifier is associated with a soft ring (SR) and the SR is configured to obtain packets from the second HRR.

20 Claims, 7 Drawing Sheets

U.S. PATENT DOCUMENTS

| | | |
|---|---|---|
| 2002/0052972 A1 | 5/2002 | Yim |
| 2003/0037154 A1 | 2/2003 | Poggio et al. |
| 2004/0267866 A1 | 12/2004 | Carollo et al. |
| 2005/0111455 A1 | 5/2005 | Nozue et al. |
| 2005/0135243 A1 | 6/2005 | Lee et al. |
| 2005/0138620 A1 | 6/2005 | Lewites |
| 2006/0026294 A1* | 2/2006 | Virdi et al. .................. 709/232 |
| 2006/0041667 A1* | 2/2006 | Ahn et al. ................... 709/229 |
| 2006/0045089 A1 | 3/2006 | Bacher et al. |
| 2006/0070066 A1 | 3/2006 | Grobman |
| 2006/0174324 A1 | 8/2006 | Zur et al. |

OTHER PUBLICATIONS

"Solaris Networking—The Magic Revealed (Part I)"; Sunay Tripathi's Solaris Networking Weblog; Nov. 14, 2005, pp. 1-22 (22 pages).

* cited by examiner

METHOD AND APPARATUS FOR DYNAMIC ASSIGNMENT OF NETWORK INTERFACE CARD RESOURCES

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" with U.S. application Ser. No. 11/112,367; "Method and Apparatus for Consolidating Available Computing Resources on Different Computing Devices" with U.S. application Ser. No. 11/112,368; "Assigning Higher Priority to Transactions Based on Subscription Level" with U.S. application Ser. No. 11/112,947; "Method and Apparatus for Dynamically Isolating Affected Services Under Denial of Service Attack" with U.S. application Ser. No. 11/112,158; "Method and Apparatus for Improving User Experience for Legitimate Traffic of a Service Impacted by Denial of Service Attack" with U.S. application Ser. No. 11/112,629; "Method and Apparatus for Limiting Denial of Service Attack by Limiting Traffic for Hosts" with U.S. application Ser. No. 11/112,328; "Hardware-Based Network Interface Per-Ring Resource Accounting" with U.S. application Ser. No. 11/112,222; "Dynamic Hardware Classification Engine Updating for a Network Interface" with U.S. application Ser. No. 11/112,934; "Network Interface Card Resource Mapping to Virtual Network Interface Cards" with U.S. application Ser. No. 11/112,063; "Network Interface Decryption and Classification Technique" with U.S. application Ser. No. 11/112,436; "Method and Apparatus for Enforcing Resource Utilization of a Container" with U.S. application Ser. No. 11/112,910; "Method and Apparatus for Enforcing Packet Destination Specific Priority Using Threads" with U.S. application Ser. No. 11/112,584; "Method and Apparatus for Processing Network Traffic Associated with Specific Protocols" with U.S. application Ser. No. 11/112,228.

The present application contains subject matter that may be related to the subject matter in the following U.S. applications filed on Oct. 21, 2005, and assigned to the assignee of the present application: "Method and Apparatus for Defending Against Denial of Service Attacks" with U.S. application Ser. No. 11/255,366; "Router Based Defense Against Denial of Service Attacks Using Dynamic Feedback from Attacked Host" with U.S. application Ser. No. 11/256,254; and "Method and Apparatus for Monitoring Packets at High Data Rates" with U.S. application Ser. No. 11/226,790.

The present application contains subject matter that may be related to the subject matter in the following U.S. applications filed on Jun. 30, 2006, and assigned to the assignee of the present application: "Network Interface Card Virtualization Based On Hardware Resources and Software Rings" with U.S. application Ser. No. 11/479,046; "Method and System for Controlling Virtual Machine Bandwidth" with U.S. application Ser. No. 11/480,000; "Virtual Switch" with U.S. application Ser. No. 11,480,261 "System and Method for Virtual Network Interface Cards Based on Internet Protocol Addresses" with U.S. application Ser. No. 11/497,997; "Virtual Network Interface Card Loopback Fastpath" with U.S. application Ser. No. 11/479,946; "Bridging Network Components" with U.S. application Ser. No. 11/479,948; "Reflecting the Bandwidth Assigned to a Virtual Network Interface Card Through Its Link Speed" with U.S. application Ser. No. 11/479,161; "Method and Apparatus for Containing a Denial of Service Attack Using Hardware Resources on a Virtual Network Interface Card" with U.S. application Ser. No. 11/480,100; "Virtual Network Interface Cards with VLAN Functionality" with U.S. application Ser. No. 11/479,998; "Generalized Serialization Queue Framework for Protocol Processing" with U.S. application Ser. No. 11/479,947; "Serialization Queue Framework for Transmitting Packets" with U.S. application Ser. No. 11/479,143.

BACKGROUND

Network traffic is transmitted from a network, such as the Internet, from a sending system (e.g., a computer system) to a receiving system (e.g., a computer system) via a physical network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed by a classifier to determine the connection associated with the packet.

Typically, the classifier includes a connection data structure that includes information about active connections on the receiving system. The connection data structure may include the following information about each active connection: (i) the queue associated with the connection; and (ii) information necessary to process the packets on the queue associated with the connection. Depending on the implementation, the connection data structure may include additional information about each active connection. Such queues are typically implemented as first-in first-out (FIFO) queues and are bound to a specific central processing unit (CPU) on the receiving computer system. Thus, all packets for a given connection are placed in the same queue and are processed by the same CPU. In addition, each queue is typically configured to support multiple connections.

Once the classifier determines the connection associated with the packets, the packets are sent to a temporary data structure (e.g., a receive ring on the NIC) and an interrupt is issued to the CPU associated with the queue. In response to the interrupt, a thread associated with the CPU (to which the serialization queue is bound) retrieves the packets from the temporary data structure and places them in the appropriate queue. Once packets are placed in the queue, those packets are processed in due course. In some implementations, the queues are implemented such that only one thread is allowed to access a given queue at any given time.

SUMMARY

In general, in one aspect, the invention relates to a method for dynamically changing a first virtual network interface card (VNIC) binding. The method includes obtaining monitoring information associated with a first hardware receive ring (HRR) and a software receive ring (SRR), wherein the first VNIC is bound to the first HRR and a second VNIC is bound to the SRR, determining, using the monitoring information, whether a use of the first HRR is below a first threshold, determining, using the monitoring information, whether a use of the SRR is above a second threshold, if the use of the first HRR is below the first threshold and the use of the SRR is above the second threshold: binding the first VNIC to the SRR and the second VNIC to the first HRR, removing the binding from the first VNIC to the first HRR, removing the binding from the second VNIC to the SRR, and reprogramming a hardware classifier to send packets associated with the first VNIC to a second HRR and to send packets associated with the second VNIC to the first HRR, reprogramming a software classifier to send packets associated with the first VNIC to the SRR, wherein the software classifier is associated with a soft ring (SR) and the SR is configured to obtain packets from the second HRR.

In general, in one aspect, the invention relates to a system that includes a physical network interface card (NIC) comprising a first hardware receive ring (HRR), a second HRR, and a hardware classifier and a host, operatively connected to the NIC. The host includes a first virtual network interface card (VNIC) initially bound to the first HRR, a software ring (SR) comprising a software classifier and a software receive ring (SRR), wherein SR is operatively connected to the second HRR, a second VNIC initially bound to the SRR, a first packet destination operatively connected to the first VNIC, a second packet destination operatively connected to the second VNIC, and a monitoring application configured to monitor the system and generate monitoring information associated with the first HRR and the SRR, wherein the host is configured to: obtain the monitoring information, determine, using the monitoring information, whether a use of the first HRR is below a first threshold, determine, using the monitoring information, whether a use of the SRR is above a second threshold, if the use of the first HRR is below the first threshold and the use of the SRR is above the second threshold: bind the first VNIC to the SRR and the second VNIC to the first HRR, remove the binding from the first VNIC to the first HRR, remove the binding from the second VNIC to the SRR, and reprogram the hardware classifier to send packets associated with the first VNIC to the second HRR and to send packets associated with the second VNIC to the first HRR, and reprogram the software classifier to send packets associated with the first VNIC to the SRR.

In general, in one aspect, the invention relates to a computer readable medium, where computer readable medium includes instructions for: obtaining monitoring information associated with a first hardware receive ring (HRR) and a software receive ring (SRR), wherein the first VNIC is bound to the first HRR and a second VNIC is bound to the SRR, determining, using the monitoring information, whether a use of the first HRR is below a first threshold, determining, using the monitoring information, whether a use of the SRR is above a second threshold, if the use of the first HRR is below the first threshold and the use of the SRR is above the second threshold, binding the first VNIC to the SRR and the second VNIC to the first HRR, removing the binding from the first VNIC to the first HRR, removing the binding from the second VNIC to the SRR, and reprogramming a hardware classifier to send packets associated with the first VNIC to a second HRR and to send packets associated with the second VNIC to the first HRR, reprogramming a software classifier to send packets associated with the first VNIC to the SRR, wherein the software classifier is associated with a soft ring (SR) and the SR is configured to obtain packets from the second HRR.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to method and apparatus for dynamically changing the allocation of network resources based on usage. More specifically, embodiments of the invention provide a method and apparatus for dynamically changing the binding of virtual network card (VNIC) from a hardware receive ring (HRR) to a software receive ring (SRR) if the HRR is under-utilized. Further, embodiments of the invention provide a method and apparatus for dynamically changing the binding of a VNIC from a SRR to a HRR, if an under-utilized HRR exists and the SRR is highly-utilized.

Figure 1:
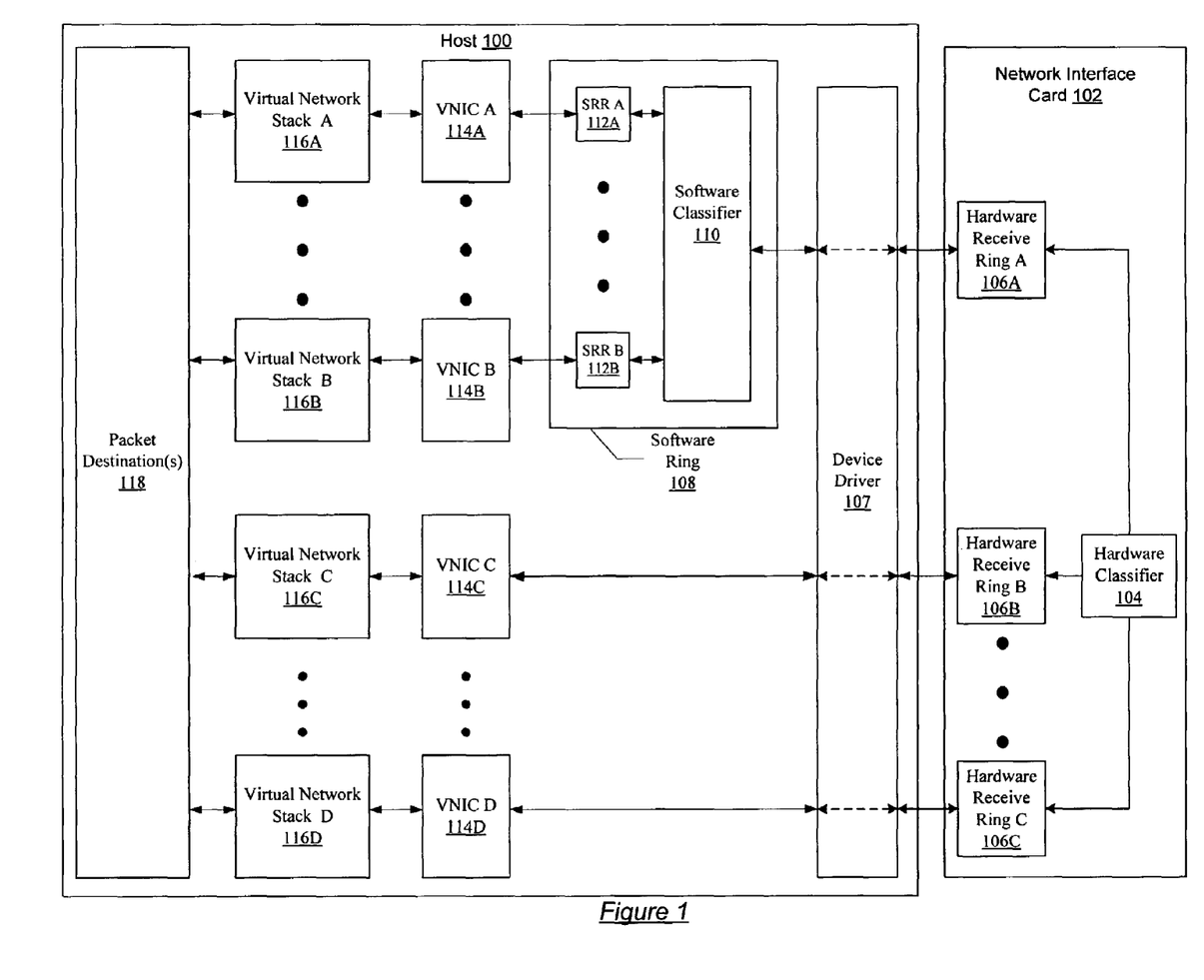
FIG. 1 shows system in accordance with one embodiment of the invention.

FIG. 1 shows a system in accordance with one embodiment of the invention. As shown in FIG. 1, the system includes a host (100) operatively connected to a NIC (102). The NIC (102) provides an interface between the host (100) and a network (not shown) (e.g., a local area network, a wide area network, a wireless network, etc.). More specifically, the NIC (102) includes a network interface (NI) (i.e., the hardware on the NIC used to interface with the network). For example, the NI may correspond to an RJ-45 connector, a wireless antenna, etc. The packets received by the NI are then sent to other components on the NIC (102) for processing. In one embodiment of the invention, the NIC (102) includes a classifier (104) and one or more hardware receive rings (HRRs) (106A, 106B, 106C). In one embodiment of the invention, the HRRs (106A, 106B, 106C) correspond to portions of memory within the NIC (102) used to temporarily store the received packets. Further, in one embodiment of the invention, a HRRs (106A, 106B, 106C) may point to host memory.

In one embodiment of the invention, the hardware classifier (104) is configured to analyze the incoming network traffic, typically in the form of packets, received from the network (not shown).

In one embodiment of the invention, analyzing individual packets includes determining to which of the HRRs (106A, 106B, 106C) each packet is sent. In one embodiment of the invention, analyzing the packets by the hardware classifier (104) includes analyzing one or more fields in each of the packets to determine to which of the HRRs (106A, 106B, 106C) the packets are sent. As an alternative, the hardware classifier (104) may use the contents of one or more fields in each packet as an index into a data structure that includes information necessary to determine to which HRR (106A, 106B, 106C) that packet is sent. The hardware classifier (104) may be implemented entirely in hardware (i.e., the hardware classifier (104) may be a separate microprocessor embedded on the NIC (102)). Alternatively, the hardware classifier (104) may be implemented in software stored in memory (e.g., firmware, etc.) on the NIC (102) and executed by a microprocessor on the NIC (102).

In one embodiment of the invention, the host (100) may include the following components: a device driver (107), a software ring (108), one or more virtual NICs (114A, 114B, 114C, 114D), one or more virtual network stacks (116A, 116B, 116C, 116D), and one or more packet destinations (118) (e.g., containers and/or services). Each of the aforementioned components is described below.

In one embodiment of the invention, the device driver (107) provides an interface between the HRRs (106A, 106B, 106C) and the host (100). More specifically, the device driver (107) exposes the HRRs (106A, 106B, 106C) to the host (100).

In one embodiment of the invention, the software ring (108) includes a software classifier (110) and a number of software receive rings (SRR) (e.g., SRR A (112A), SRR B (112B)). In one embodiment of the invention, the software classifier (110) has the same functionality as the hardware classifier (104). However, instead of sending the classified packets to a HRR (106A, 106B, 106C), the software classifier (110) forwards classified packets to one of the SRRs (112A, 112B). The SRRs (112A, 112B) like the HRRs (106A, 106B, 106C) are configured to temporarily store the received packets after being classified by the software classifier (110).

In one embodiment of the invention, each of the virtual NICs (114A, 114B, 114C, 114D) is associated with either a SRR (112A, 112B) or a HRR (106A, 106B, 106C). The virtual NICs (114A, 114B, 114C, 114D) provide an abstraction layer between the NIC (102) and the various packet destinations (118) (e.g., containers and/or services) executing on the host (100). More specifically, each virtual NIC (114A, 114B, 114C, 114D) operates like a NIC (100). For example, in one embodiment of the invention, each virtual NIC (114A, 114B, 114C, 114D) is associated with one or more Internet Protocol (IP) addresses, one or more Media Access Control (MAC) address, optionally, one or more ports, and, is optionally configured to handle one or more protocol types. Thus, while the host (100) may be operatively connected to a single NIC (102), packet destinations (118) (e.g., containers and/or services) executing on the host (100)) operate as if the host (100) is bound to multiple NICs.

Each of the virtual NICs (114A, 114B, 114C, 114D) is operatively connected to a corresponding virtual network stack (116A, 116B, 116C, 116D). In one embodiment of the invention, each virtual network stack (116A, 116B, 116C, 116D) includes functionality to process packets in accordance with various protocols used to send and receive packets (e.g., Transmission Communication Protocol (TCP), Internet Protocol (IP), User Datagram Protocol (UDP), etc.). Further, each virtual network stack (116A, 116B, 116C, 116D) may also include functionality, as needed, to perform additional processing on the incoming and outgoing packets. This additional processing may include, but is not limited to, cryptographic processing, firewall routing, etc.

In one embodiment of the invention, each virtual network stack (116A, 116B, 116C, 116D) includes network layer and transport layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). In one embodiment of the invention, transport layer functionality corresponds to functionality to manage the transfer of packets on the network (e.g., functionality to support TCP, UDP, Stream Control Transmission Protocol (SCTP), etc.). The structure and functionality of the virtual network stacks (116A, 116B, 116C, 116D) is discussed in FIG. 2.

As discussed above, the host (100) includes one or more packet destinations (118) (e.g., containers and/or services). In one embodiment of the invention, the packet destination(s) (118) (e.g., containers and/or services) corresponds to any process or group of processes executing on the host that sends and receives network traffic. Examples of packet destinations (118) include, but are not limited to containers, services (e.g., web server), etc. As shown in FIG. 1, each of the virtual network stacks (116A, 116B, 116C, 116D) is associated with a packet destination (118). In one embodiment of the invention, each packet destination is associated with a single virtual network stack (116A, 116B, 116C, 116D). Alternatively, each packet destination is associated with one or more virtual network stacks (116A, 116B, 116C, 116D).

In one embodiment of the invention, each virtual network stack (116A, 116B, 116C, 116D) is associated with a bandwidth allocation. Those skilled in the art will appreciate that if there is only one virtual network stack (116A, 116B, 116C, 116D) bound to the packet destination (118), then the bandwidth allocation of the virtual network stack (116A, 116B, 116C, 116D) corresponds to the bandwidth allocated to the packet destination (118). In one embodiment of the invention, the bandwidth allocation corresponds to the number of packets the packet destination may receive in a given time interval (e.g., seconds). The bandwidth allocation for a given packet destination is enforced by the virtual network stack operating in polling mode (discussed in FIG. 4).

In one embodiment of the invention, the virtual NIC (114A, 114B, 114C, 114D) may be bound to a virtual machine (e.g., Xen Domain) instead of a virtual network stack (116A, 116B, 116C, 116D). In such cases, the virtual NIC is bound to an interface (e.g., a Xen interface), where the interface enables the virtual NIC to communicate to with the virtual machine. In one embodiment of the invention, the aforementioned virtual machine includes its own virtual network stack and includes its own operating system (OS) instance, which may be different than the OS executing on the host.

Though not shown in FIG. 1, the host (100) includes a monitoring application. The monitoring application is configured to monitor the flow of packet though the HRRs and the SRRs. Based on the aforementioned monitoring, the monitoring application is configured to determine whether any of the SRRs are highly-utilized and if any of the HRRs are under-utilized.

In one embodiment of the invention, a HRR is under-utilized if less than a minimum threshold number of packets passed through the HRR in a given time interval (e.g., packets/second). The minimum threshold number of packets may be set on a per-HRR basis, on a host-wide basis, or on a system-wide basis. In one embodiment of the invention, if the minimum threshold number of packets is set on a per-HRR basis, then minimum threshold for the HRR may be set manually or may be set as a percentage (e.g., 10 percent of bandwidth allocated) of the bandwidth allocation for the packet destination bound to the HRR. Another function, besides a percentage, may be used to set the minimum threshold number of packets.

In one embodiment of the invention, an SRR is highly utilized if more than a maximum threshold number of packets has passed through the SRR in a given time interval (e.g., packets/second). The maximum threshold number of packets may be set of a per-SRR basis, on a host-wide basis, or on a system-wide basis. In one embodiment of the invention, if the maximum threshold number of packets is set on a per-SRR basis, then the maximum threshold for the SRR may be set manually or may be set as a percentage (e.g., 85% of bandwidth allocated) of the bandwidth allocation for the packet destination bound to the SRR. Another function, besides a percentage, may be used to set the maximum threshold number of packets.

In one embodiment of the invention, the monitoring application continuously monitors the HRRs and the SRRs. The host periodically (typically on the minute scale, e.g., every 5 minutes) obtains the monitoring information from the monitoring application, analyzes the information and then, based on the results of the analysis, determines whether the VNIC bindings (i.e., the VNIC-SRR and VNIC-HRR bindings) need to modified. The analysis performed by the host is described in FIG. 5 below.

In one embodiment of the invention, the VNIC or VNS (or individual components within the VNS) may be monitored instead of the SRR or HRR to determine under-utilization and/or high-utilization.

Figure 2:
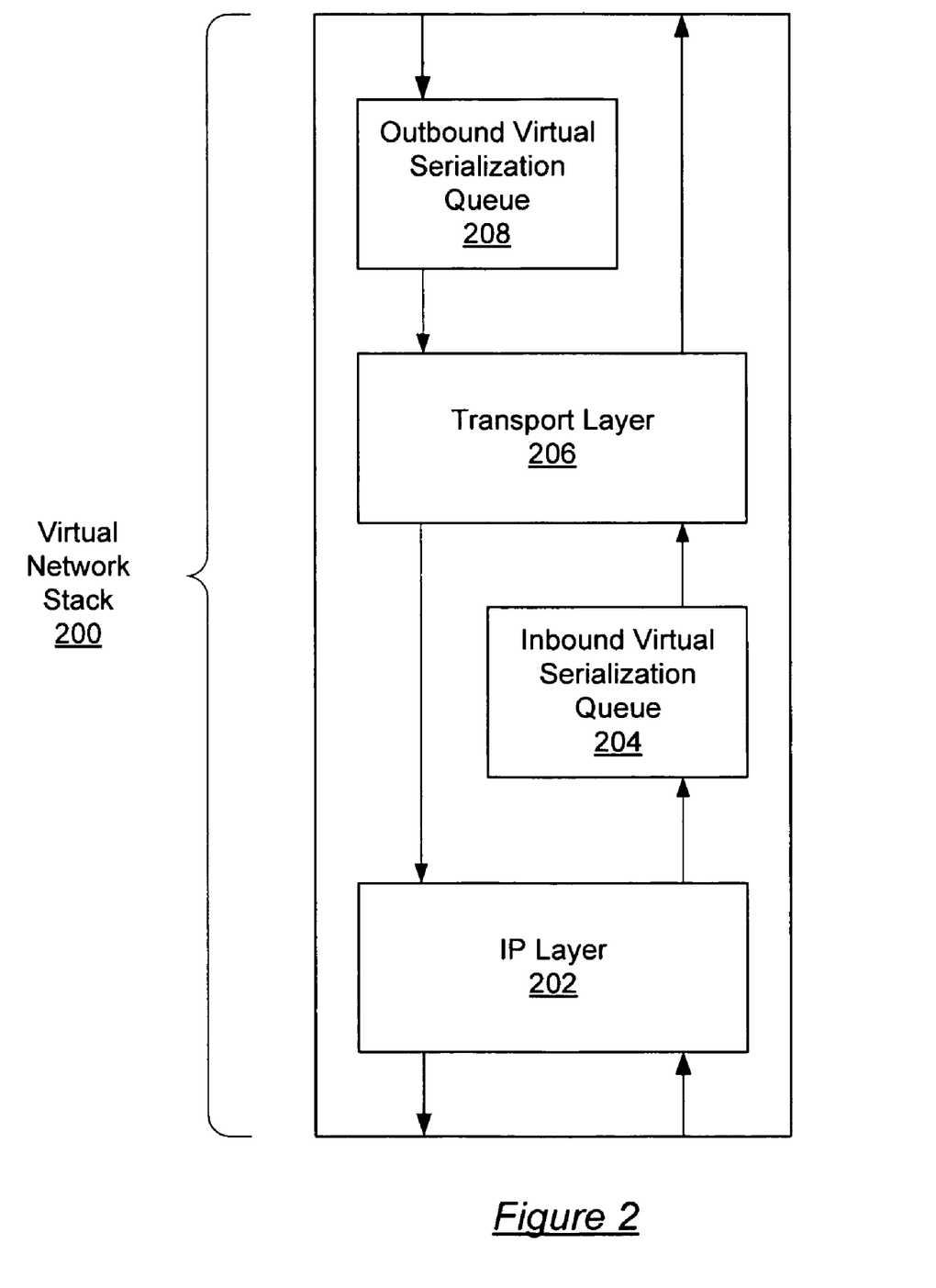
FIG. 2 shows a virtual network stack in accordance with one embodiment of the invention.

FIG. 2 shows a virtual network stack (VNS) in accordance with one embodiment of the invention. In one embodiment of the invention, the VNS (200) includes an Internet Protocol (IP) layer (202), an inbound virtual serialization queue (204), a transport layer (206), and an outbound serialization queue (208). Each of the aforementioned components is discussed below.

In one embodiment, the IP layer (202) is configured to receive packets from the VNIC associated with the VNS (204) (e.g., VNS 1 (112) receives packets from VNIC (106) in FIG. 1). Further, the IP layer (202) is configured to receive packets from the transport layer (106). In one embodiment of the invention, the IP layer (202) is configured to perform IP level processing for both inbound and outbound packets.

Continuing with the discussion of FIG. 2, the inbound VSQ (204) is configured to receive packets from the IP layer (202). The inbound VSQ (204) corresponds to a queue data structure and is configured to queue packets received from the IP layer (202) prior to the packets being received by the transport (206). In one embodiment of the invention, the inbound VSQ (204) may be used to control the number of packets being received by the VM associated with VNS. The inbound VSQ (204) may control the bandwidth by limiting the number of packets in the VSQ (204) and preventing additional packets from entering the VNS (200) until the inbound VSQ (204) has fewer than a threshold number of packets.

In one embodiment of the invention, the transport layer (206) is configured to process inbound and outbound packets in accordance with Transmission Control Protocol (TCP), User Datagram Protocol (UDP), or both UDP and TCP.

In one embodiment of the invention, the outbound VSQ (208) is a queue data structure configured to receive packets from the VM with which the VNS (204) is associated. Further, the outbound VSQ (208) is configured to store packets prior to sending the received packets to the transport layer (206). In one embodiment of the invention, the outbound VSQ (208) is also configured to control the flow of packets from the VM associated with the VNS (204) to the VNS (204). In one embodiment of the invention, the outbound VSQ (208) (or a related process) is configured to block an application for sending packets to the outbound VSQ (208), if the VM is attempting to issue packets at a higher rate than the outbound bandwidth allocated to the VM. Further, the outbound VSQ (208) (or a related process) is configured to notify the VM when it is no longer blocked from issuing packets to the VNS (204).

In one embodiment of the invention, the inbound VSQ (204) and outbound VSQ (208) are each configured to enforce the manner in which packets are processed. Specifically, the inbound VSQ (204) and outbound VSQ (208) may be configured to enforce the packet processing requirements imposed by the transport layer (206). For example, TCP requires serial processing of packets. Thus, the inbound VSQ (204) and outbound VSQ (208) may require all threads accessing the inbound VSQ (204) and outbound VSQ (208) to conform to a mutual exclusion policy. In one embodiment of the invention, the mutual exclusion policy requires that only one thread may access the VSQ at a time. Thus, if two threads are attempting to access a given VSQ, one thread must wait until the other thread has finished accessing the VSQ.

Alternatively, if the transport layer (206) only supports UDP, then the inbound VSQ (204) and outbound VSQ (208) may be configured to allow concurrent access. Said another way, two or more threads may concurrently access the VSQ. In one embodiment of the invention, if the transport layer (206) is configured to process both TCP and UDP packets, then the inbound VSQ (204) and outbound VSQ (208) are configured to conform to the more stringent standard (e.g., TCP if the transport layer supports both TCP and UDP).

Figure 3:
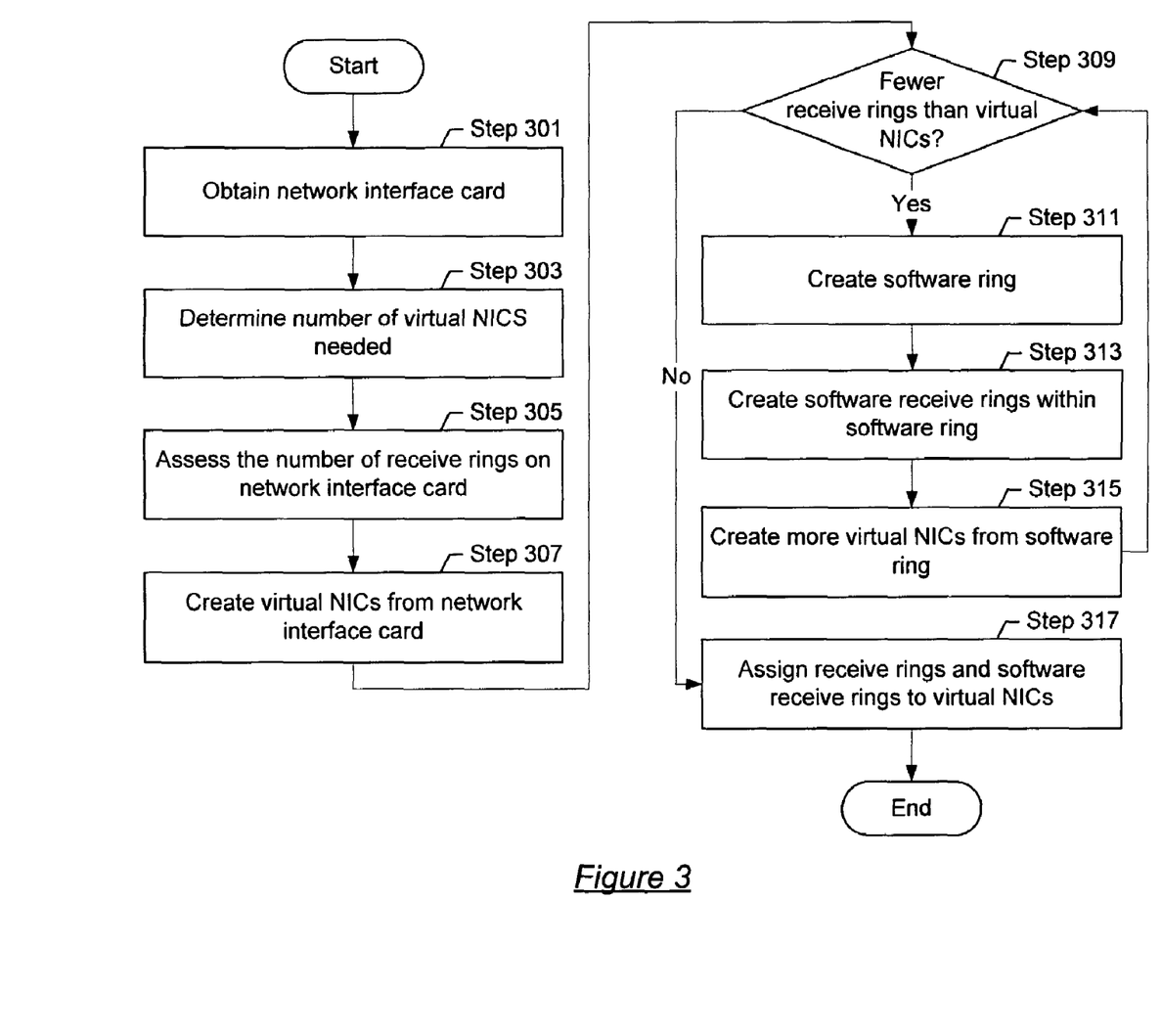
FIGS. 3-5 show flow charts in accordance with one embodiment of the invention.

FIG. 3 shows a flow diagram in accordance with one or more embodiments of the invention. First, a network interface card (NIC) is obtained (Step 301). As stated above, the NIC is connected to a host and is responsible for sending and receiving packets between the host and a physical network. Once the NIC is obtained, a determination is made regarding the number of virtual NICs needed on the host (Step 303). In one or more embodiments of the invention, the number of virtual NICs created corresponds to the number of packet destinations on the host. Further, in one or more embodiments of the invention, packet destinations on the host correspond to containers or services that send and receive packets. For example, a virtual NIC may be created for each virtual machine on the host, or a virtual NIC may be created for each application running on each virtual machine on the host.

Once the number of virtual NICs to be created has been determined, the hardware receive rings on the NIC are assessed (Step 305). In one or more embodiments of the invention, a single hardware receive ring corresponds to a single virtual NIC and temporarily stores packets to be sent to the virtual NIC. As a result, when more virtual NICs are needed than there are hardware receive rings on the NIC, one or more soft rings are created to appropriately route packets to the extra virtual NICs.

Virtual NICs are first created from the NIC (Step 307). Next, a determination is made about whether fewer hardware receive rings exist on the NIC than there are virtual NICs (Step 309). If not, the hardware receive rings on the NIC are assigned to virtual NICs (Step 317). Otherwise, a software ring is created on top of one of the hardware receive rings on the NIC (Step 311). A set of software receive rings is then created within the software ring (Step 313) and more virtual NICs are created and assigned to the software ring (Step 315). As described in FIG. 1, the software ring is associated with a software classifier, which directs packets to the appropriate software receive rings based on the contents of the fields in the packet headers.

Once the virtual NICs have been associated with the software ring, a determination is made about whether more virtual NICs need to be created (Step 309). If so, the process is repeated until all virtual NICs can be assigned a hardware receive ring or software receive ring; then the hardware receive rings and software receive rings are assigned to the virtual NICs (Step 317).

In one embodiment of the invention, each of the aforementioned VNICs is associated with a virtual network stack (VNS). Further, each VNS is associated with a bandwidth allocation.

As stated above, software rings can be arbitrarily created on top of HRR or software SRRs with the software rings. As a result, different structures involving software rings can be created to handle the same number of virtual NICs using the method shown in FIG. 3.

Figure 4:
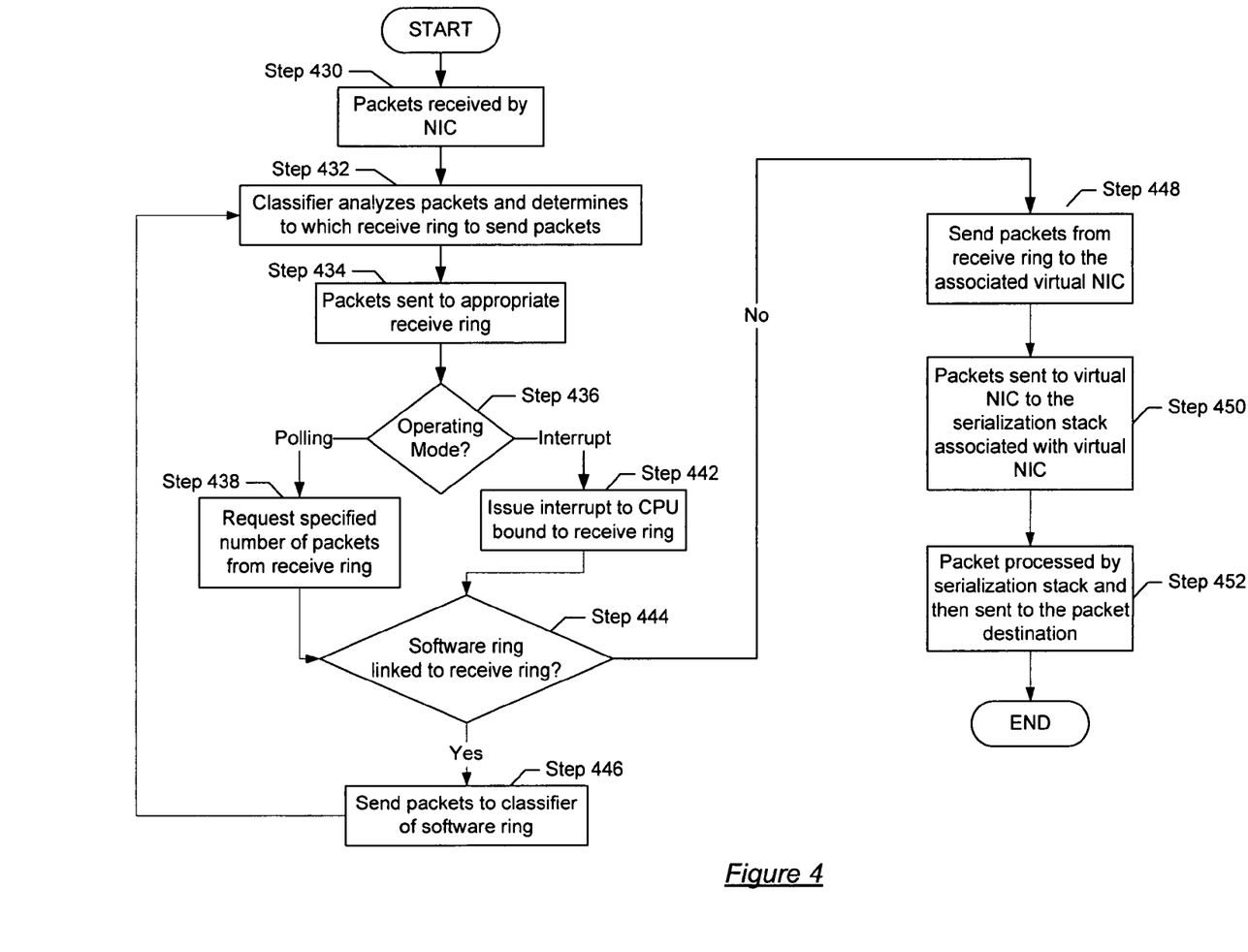

FIG. 4 shows a flow diagram in accordance with one or more embodiments of the invention. Initially, packets are received by a NIC (Step 430). Next, a classifier associated with the NIC determines to which receive ring (HRR or SSR) on the NIC to send the packets (Step 432). The packets are then sent to the appropriate receive ring (Step 434) based on the classifier's assessment. At this stage, the processing of the packets differs depending on mode in which the virtual serialization queue (which is bound to the receive ring or connected to the receive ring via a software ring) is operating. The aforementioned virtual serialization queue is associated with the serialization stack bound to virtual NIC associated with the receive ring. Continuing with the discussion of FIG. 4, the processing of the packets depends on whether the virtual serialization queue is operating in polling mode or interrupt mode (Step 436).

If the virtual serialization queue is operating in polling mode, then the packets remain in the receive ring until the virtual serialization queue requests a specified number of packets from the receive ring (Step 438). In one embodiment of the invention, the virtual serialization queue does not request any packets when there are packets already queued on the virtual serialization queue. In one or more embodiments of the invention, the virtual serialization queue retrieves all packets from the receive ring when a request is made for packets. Those skilled in the art will appreciate that the receive rings store a finite number of packets. Thus, if the receive rings receive packets at a faster rate than the rate at which the corresponding virtual serialization queues requests the packets, the receive rings will eventually fill completely with packets and packets received after this point are dropped until packets on the receive rings are requested and processed. In one embodiment of the invention, the rate at which packets are requested from the receive ring (SRR or HRR) and the number of packets requested is determined by the bandwidth allocation of the virtual network stack bound to the receive ring.

Alternatively, if the virtual serialization queue is operating in interrupt mode, then an interrupt is issued to the CPU bound to the receive ring (i.e., the CPU bound to the virtual serialization queue that is bound to the stack associated with the receive ring) (Step 442). The packets are then sent to the virtual serialization queue or an intermediate software ring based on the structure of the system.

Once the packets are requested, a determination is made about whether a software ring is linked to the receive ring (Step 444). If so, the packets are sent to the software classifier corresponding to the software ring (Step 446), which further forwards the packets to the appropriate software receive rings according to the operating mode (Step 432-Step 444). In the event that the receive ring is an HRR and the HRR is bound to a software ring, the classifier in Step 432 now corresponds to a software classifier and all references to receive rings in Steps 432-444 correspond to SRRs. Said another way, when Steps 432-444 are initially performed, the classifier corresponds to a hardware classifier and the receive rings correspond to HRRs. However, if the HRR is bound to a software ring (Step 446), then in all subsequent executions of Steps 432-444, the classifier corresponds to a software classifier and all references to receive rings in Steps 432-444 correspond to SRRs.

Continuing with the discussion of FIG. 4, if the HRR (or SRR) is bound to a virtual NIC, then the packets are sent to the virtual NIC (Step 448). The virtual NIC subsequently forwards the packets to the associated serialization stack (Step 450), where the packets are processed and then sent to the packet destination (e.g., a virtual machine, a container, a service, etc.) (Step 452).

Figure 5:
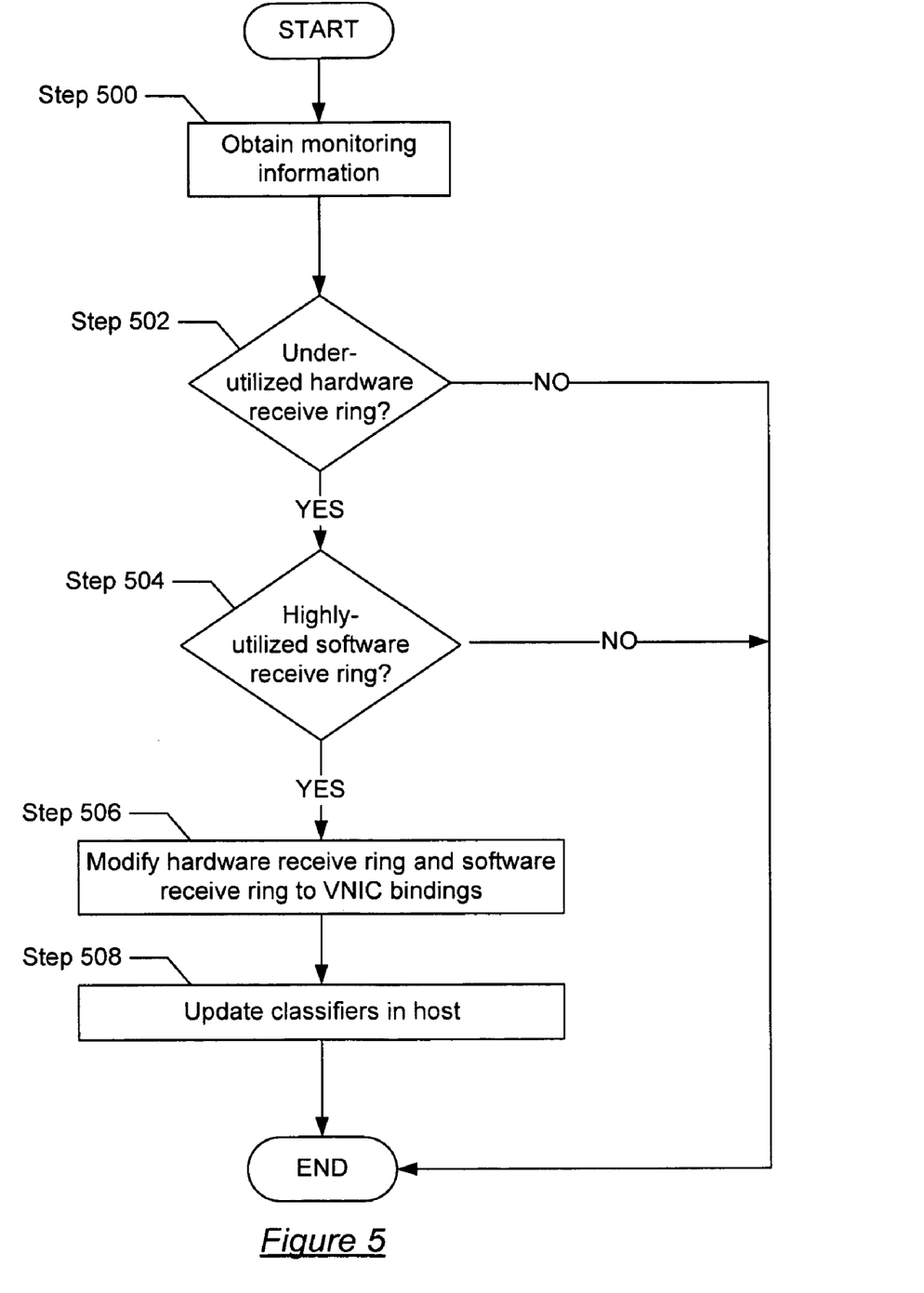

FIG. 5 shows a flowchart in accordance with one embodiment of the invention. More specifically, FIG. 5 shows a method for analyzing the monitoring information by the host and then, based on the results, modifying the VNIC bindings. Initially, monitoring information is obtained by the host (Step 500). The host, using the monitoring information, determines whether one or more under-utilized hardware receive rings exist (Step 502). If there are no under-utilized hardware receive rings, then the process ends.

If at least one under-utilized hardware receive ring exists, then a determination is made about whether one or more highly-utilized software receive rings exist (Step 504). If no highly-utilized software receive rings exist, then the process ends.

If at least one highly-utilized software receive ring exists, then the hardware receive ring bindings and the software receive ring bindings to the virtual NICs are modified (Step 506). For example, if one under-utilized hardware receive ring exists and one highly-utilized software receive ring exists, then the following modification occurs: (i) the binding between the virtual NIC (VNIC 1) currently bound to the under-utilized hardware receive ring (HRR 1) is removed, (ii) the binding between the virtual NIC (VNIC 2) currently bound to the highly-utilized software receive ring (SRR) is removed, (iii) VNIC 1 is bound to SRR, and (iv) VNIC 2 is bound to HRR 1.

Once the virtual NIC bindings have been modified, the classifiers (hardware and software) are updated (Step 508). Continuing with the example above, the hardware classifier is updated such that HRR 1 receives packets for VNIC 2 (or more specifically the packet destination bound (or virtual machine) to VNIC 2) and that HRR 2 (another HRR on the same NIC as HRR 1) additionally receives packets for VNIC 1 (or, more specifically, the packet destination bound (or virtual machine) to VNIC 1). Further, the software classifier is updated to send packets for VNIC 1 to SRR 1. Once Steps 506 and 508 are complete, the host is able to resume the transfer of packets from the NIC to the appropriate packet destination (or virtual machine).

In one embodiment of the invention, the method in FIG. 5 may be extended to include modifying the binding of multiple SRRs and multiple HRRs (e.g., two under-utilized HRRs and one highly-utilized SRR, two under-utilized HRRs and two highly-utilized SRRs, etc.). In the case where there are more highly-utilized SRRs than under-utilized HRRs (e.g., two under-utilized HRRs and three highly-utilized SRRs), then the host may determine which of the VNICs bound to the highly-utilized SRRs to reassign to the two under-utilized HRRs based on, for example, the relative priority of the packet destinations (or virtual machines) bound to the VNICs (i.e., the VNICs bound to the highly-utilized SRRs). Other methods for determine which VNICs (i.e., the VNICs bound to the highly-utilized SRRs) to reassign may also be used by the host.

Figure 6:
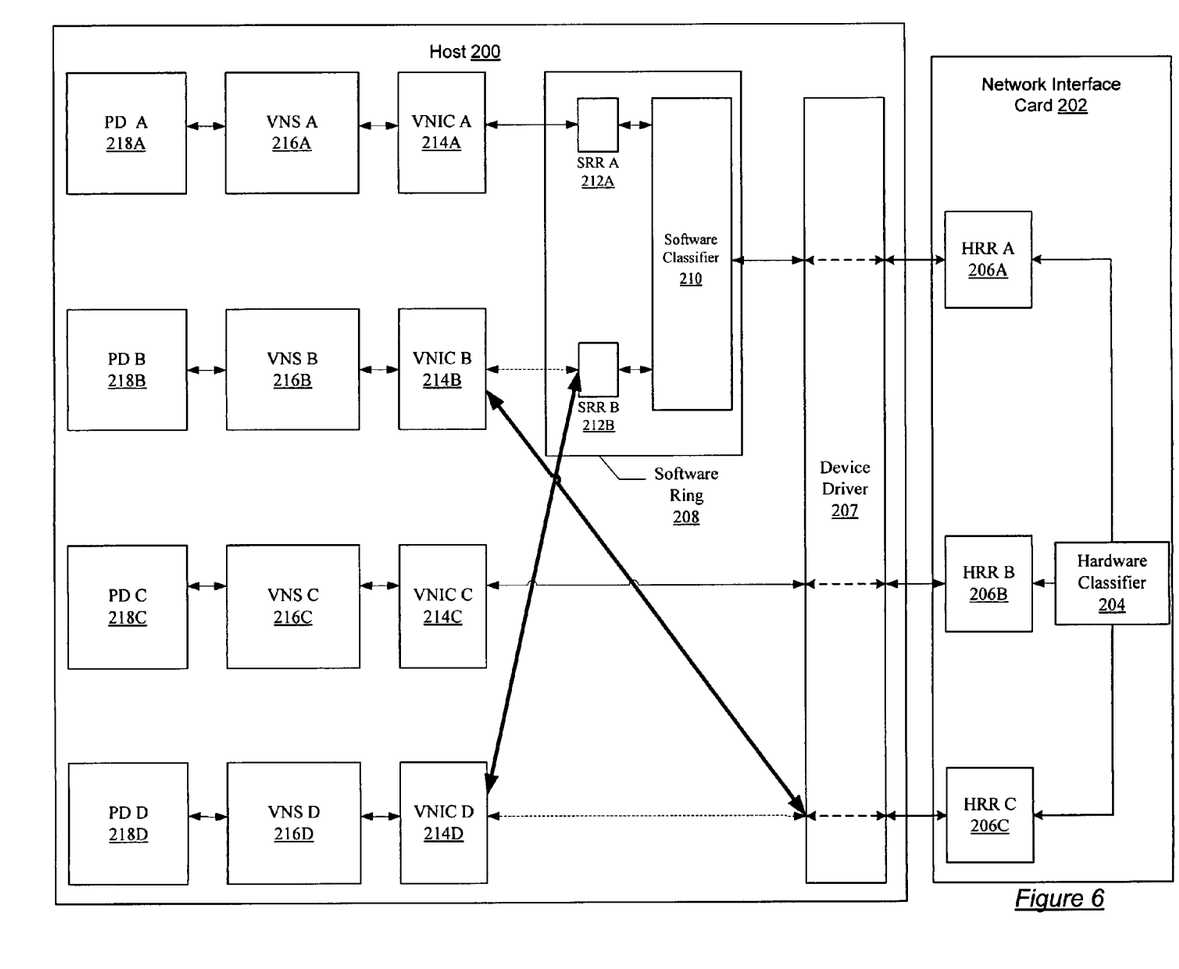
FIG. 6 shows an example in accordance with one embodiment of the invention.
Figure 7:
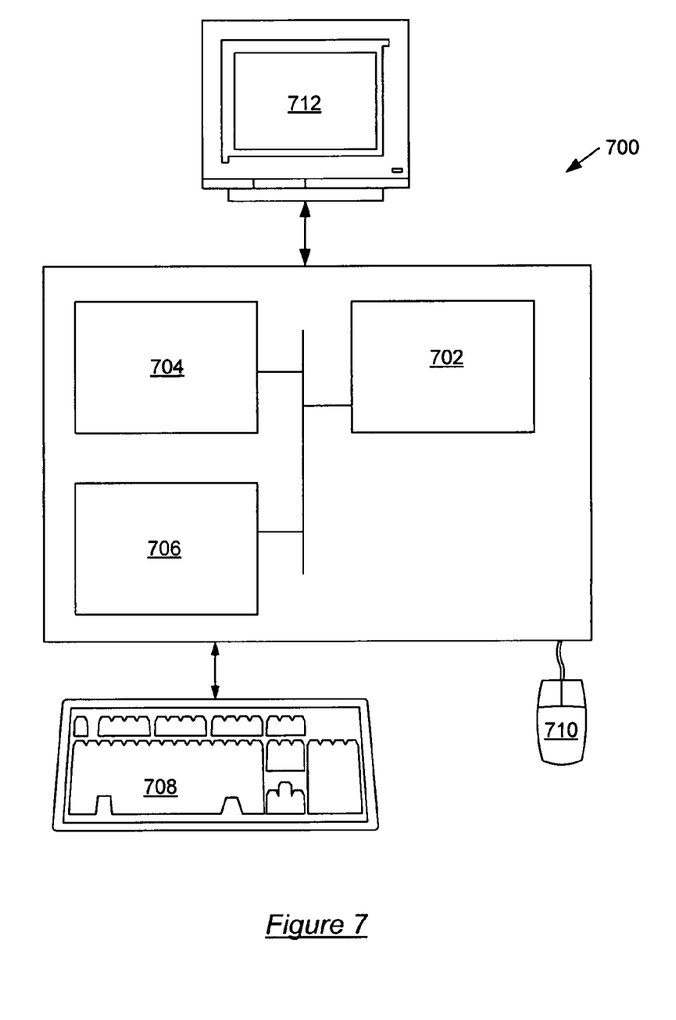
FIG. 7 shows a computer in accordance with one embodiment of the invention.

FIG. 6 shows an example in accordance with one embodiment of the invention. The example is not intended to limit the scope of the invention. Turing to the example, the system includes three hardware receive rings (HRRs) (206A, 206B, 206C). Further, HRR A (206A) is operatively connected (via device driver (207) to a software ring (208).

As shown in FIG. 6, the software ring (208) includes a software classifier (210) and two software receive rings (SRRs) (e.g., SRR A (212A), SRR B (212B). SRR A (212A) is initially bound to VNIC A (214A) and SRR B (212B) is initially bound to VNIC B (214B). Further, HRR B (206B) is initially bound to VNIC C (214C) and HRR C (206C) is initially bound to VNIC D (214D).

Further, the hardware classifier (204) is initially configured to: (i) send packets for PD A (218A) and PD B (218B) to HRR A (206), (ii) to send packets for PD C (218C) to HRR B (206B), and (iii) to send packets for PD D (218D) to HRR C (206C). In addition, the software classifier (210) is initially configured to: (i) send packets for PD A (218A) to SRR A (212A) and (ii) send packets for PD B (218B) to SRR B (212B).

Each of the aforementioned VNICs (214A, 214D, 214C, 214D) is bound to a virtual network stack (VNS) (e.g., VNS A (216A), VNS B (216B), VNS C (216C), VNS D (216D)). Further, each VNS (e.g., VNS A (216A), VNS B (216B), VNS C (216C), VNS D (216D)) is bound to a packet destination (PD) (e.g., PD A (218A), PD B (218B), PD C (218C), PD D (218D)).

For the purpose of this example, assume the HRR C (206C) is under-utilized and that SRR B (212B) is highly-utilized. Accordingly, the binding of VNIC B (214B) to SRR B (212B) is removed and the binding of VNIC D (214D) to HRR C (206C) is removed. VNIC B (214B) is then bound to HRR C (206C) and VNIC D (214 D) is bound to SRR B (212B). Further, the hardware classifier (204) is updated to send packets for PD B (218) to HRR C (206) and to send packets to PD D (218D) to HRR A (206A). In addition, the software classifier (210) is updated to send packets for PD D (218D) to SRR B (212B). Note that after the aforementioned updates, the hardware classifier (204) does not send packets for PD D (218D) to HRR C (206) or packets for PD B (218B) to HRR A (206A). In addition, after the update, the software classifier (210) does not send packets for PD B (218B) to SRR B (212B).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for dynamically changing a first virtual network interface card (VNIC) binding, comprising:
    obtaining monitoring information associated with a first hardware receive ring (HRR) and a software receive ring (SRR), wherein the first VNIC is bound to the first HRR and a second VNIC is bound to the SRR;
    determining, using the monitoring information, whether a use of the first HRR is below a first threshold;
    determining, using the monitoring information, whether a use of the SRR is above a second threshold;
    if the use of the first HRR is below the first threshold and the use of the SRR is above the second threshold:
        binding the first VNIC to the SRR and the second VNIC to the first HRR;
        removing the binding from the first VNIC to the first HRR;
        removing the binding from the second VNIC to the SRR; and
        reprogramming a hardware classifier to send packets associated with the first VNIC to a second HRR and to send packets associated with the second VNIC to the first HRR;
        reprogramming a software classifier to send packets associated with the first VNIC to the SRR,
        wherein the software classifier is associated with a soft ring (SR) and the SR is configured to obtain packets from the second HRR.

2. The method of claim 1, wherein the monitoring information is obtained at a set interval.

3. The method of claim 2, wherein the set interval is set on a minute time scale.

4. The method of claim 1, wherein the first threshold corresponds to a number of packets received by the HRR in a given time interval.

5. The method of claim 1, wherein the second threshold corresponds to a number of packets received by the SRIR in a given time interval.

6. The method of claim 1, wherein first VNIC is bound to a first virtual network stack (VNS).

7. The method of claim 6, wherein the first VNS is configured to obtain packets from the first VNIC based an operating mode.

8. The method of claim 7, wherein the operating mode is one selected from a group consisting of polling mode and interrupt mode.

9. The method of claim 8, wherein the polling mode enforces bandwidth control on the first VNIC.

10. A system, comprising:
    a physical network interface card (NIC) comprising a first hardware receive ring (HRR), a second HRR, and a hardware classifier;
    a host, operatively connected to the NIC, comprising:
        a first virtual network interface card (VNIC) initially bound to the first HRR;
        a software ring (SR) comprising a software classifier and a software receive ring (SRR), wherein SR is operatively connected to the second HRR;
        a second VNIC initially bound to the SRR;
        a first packet destination operatively connected to the first VNIC;
        a second packet destination operatively connected to the second VNIC; and
        a monitoring application configured to monitor the system and generate monitoring information associated with the first HRR and the SRR,
    wherein the host is configured to:
        obtain the monitoring information;
        determine, using the monitoring information, whether a use of the first HRR is below a first threshold;
        determine, using the monitoring information, whether a use of the SRR is above a second threshold;
        if the use of the first HRR is below the first threshold and the use of the SRR is above the second threshold:
            bind the first VNIC to the SRR and the second VNIC to the first HRR;

remove the binding from the first VNIC to the first HRR;

remove the binding from the second VNIC to the SRR; and reprogram the hardware classifier to send packets associated with the first VNIC to the second HRR and to send packets associated with the second VNIC to the first HRR; and reprogram the software classifier to send packets associated with the first VNIC to the SRR.

11. The system of claim 10, wherein the monitoring information is obtained at a set interval.

12. The system of claim 11, wherein the set interval is set on a minute time scale.

13. The system of claim 10, wherein the first threshold corresponds to a number of packets received by the HRR in a given time interval.

14. The system of claim 10, wherein the second threshold corresponds to a number of packets received by the SRR in a given time interval.

15. The system of claim 10, wherein first VNIC is bound to a first virtual network stack (VNS).

16. The system of claim 15, wherein the first VNS is configured to obtain packets from the first VNIC based an operating mode.

17. The system of claim 16, wherein the operating mode is one selected from a group consisting of polling mode and interrupt mode.

18. The system of claim 16, wherein the polling mode enforces bandwidth control on the first VNIC.

19. A computer readable medium encoded with instructions capable of being executed by a computer for:

obtaining monitoring information associated with a first hardware receive ring (HRR) and a software receive ring (SRR), wherein the first VNIC is bound to the first HRR and a second VNIC is bound to the SRR;

determining, using the monitoring information, whether a use of the first HRR is below a first threshold;

determining, using the monitoring information, whether a use of the SRR is above a second threshold;

if the use of the first HRR is below the first threshold and the use of the SRIR is above the second threshold:

binding the first VNIC to the SRR and the second VNIC to the first HRR;

removing the binding from the first VNIC to the first HRR;

removing the binding from the second VNIC to the SRR; and reprogramming a hardware classifier to send packets associated with the first VNIC to a second HRR and to send packets associated with the second VNIC to the first HRR;

reprogramming a software classifier to send packets associated with the first VNIC to the SRR, wherein the software classifier is associated with a soft ring (SR) and the SR is configured to obtain packets from the second HRR.

20. The computer readable medium of claim 19, wherein the first VNIC is associated with a virtual machine.

\* \* \* \* \*

UNITED STATES PATENT AND TRADEMARK OFFICE
CERTIFICATE OF CORRECTION

PATENT NO. : 7,613,198 B2  Page 1 of 1
APPLICATION NO. : 11/479817
DATED : November 3, 2009
INVENTOR(S) : Kais Belgaied et al.

It is certified that error appears in the above-identified patent and that said Letters Patent is hereby corrected as shown below:

In Claim 5, Column 12 (line 24), please replace "SRIR" with --SRR--;

In Claim 19, Column 14 (line 12), please replace "SRIR" with --SRR--.

Signed and Sealed this

Twenty-ninth Day of December, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,613,198 B2 | Page 1 of 1 |
| APPLICATION NO. | : 11/479817 | |
| DATED | : November 3, 2009 | |
| INVENTOR(S) | : Belgaied et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 608 days.

Signed and Sealed this

Nineteenth Day of October, 2010

David J. Kappos
*Director of the United States Patent and Trademark Office*